United States Patent
Kaiser et al.

(10) Patent No.: US 9,621,001 B2
(45) Date of Patent: Apr. 11, 2017

(54) ROTOR ASSEMBLY FOR ELECTRIC MACHINE HAVING MECHANICAL RETENTION SYSTEM FOR MAGNETS

(71) Applicant: GM GLOBAL TECHNOLOGY OPERATIONS LLC, Detroit, MI (US)

(72) Inventors: Edward L. Kaiser, Orion, MI (US); Paul Buchholz, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 841 days.

(21) Appl. No.: 14/061,173

(22) Filed: Oct. 23, 2013

(65) Prior Publication Data

US 2015/0108866 A1    Apr. 23, 2015

(51) Int. Cl.
*H02K 1/28* (2006.01)
*H02K 1/27* (2006.01)

(52) U.S. Cl.
CPC .............. *H02K 1/28* (2013.01); *H02K 1/2766* (2013.01)

(58) Field of Classification Search
CPC .................................. H02K 1/27; H02K 1/18
USPC .......... 310/156.08, 156.16, 156.53, 216.059, 310/216.058, 216.015, 216.016, 216.017, 310/216.018
See application file for complete search history.

(56) References Cited

U.S. PATENT DOCUMENTS

| | | | | |
|---|---|---|---|---|
| 3,659,129 A | * | 4/1972 | Pettersen | H02K 17/16 310/211 |
| 4,168,792 A | * | 9/1979 | Morin | D04C 7/00 223/102 |
| 4,597,168 A | * | 7/1986 | Oboshi | B21D 28/22 29/596 |
| 7,919,898 B2 | * | 4/2011 | Wang | H02K 1/276 310/216.058 |
| 9,099,897 B2 | * | 8/2015 | Neuenschwander | B23P 11/005 |
| 2009/0079285 A1 | * | 3/2009 | Koumura | H02K 21/044 310/156.16 |
| 2009/0230801 A1 | * | 9/2009 | Yamada | H02K 1/276 310/156.16 |
| 2013/0038163 A1 | * | 2/2013 | Kim | H02K 1/276 310/156.16 |
| 2014/0062243 A1 | * | 3/2014 | Falk | H02K 1/276 310/156.08 |

* cited by examiner

*Primary Examiner* — Terrance Kenerly
(74) *Attorney, Agent, or Firm* — Quinn IP Law

(57) ABSTRACT

A rotor assembly for an electric machine includes a plurality of lamination sheets. Each of the lamination sheets defines an aperture. The lamination sheets are disposed adjacent each other to define a laminated stack. The apertures are aligned with each other to define a slot extending parallel with a central axis of the laminated stack. A magnet is disposed within the slot. The lamination sheets include a group of recess lamination sheets and a tab lamination sheet. The tab lamination sheet includes a tab that extends into the slot, and into abutting engagement with the magnet to bias the magnet against a wall of the slot. The apertures of the group of recess lamination sheets include a groove portion that defines a groove. The tab of the tab lamination sheet is at least partially disposed within the groove defined by the recess lamination sheets.

17 Claims, 2 Drawing Sheets

ROTOR ASSEMBLY FOR ELECTRIC MACHINE HAVING MECHANICAL RETENTION SYSTEM FOR MAGNETS

TECHNICAL FIELD

The invention generally relates to an internal permanent magnet machine, and, more particularly to a rotor assembly for the internal permanent magnet machine.

BACKGROUND

Interior Permanent Magnet (IPM) machines include a rotor having a plurality of magnets of alternating polarity disposed around an outer periphery of the rotor. The rotor is rotatable within a stator, which includes a plurality of windings or conductor bars. The rotor magnetically interacts with the stator to generate rotation of the rotor about an axis of rotation, i.e., a central axis.

The rotor is typically manufactured by laminating a plurality of lamination sheets together, to define a lamination stack. Each lamination sheet defines an aperture. When the lamination sheets are stacked together, the apertures of each of the lamination sheets are aligned along the central axis to define a slot. Each of the lamination sheets defines a plurality of apertures, which are aligned to define a plurality of different slots. One magnet is disposed within each of the slots. Typically, an adhesive, such as but not limited to an epoxy, bonds and/or adheres the magnets to the laminated stock within the slots.

SUMMARY

A rotor assembly for an electric machine is provided. The rotor assembly includes a plurality of lamination sheets. Each of the lamination sheets defines an aperture. The plurality of lamination sheets is disposed adjacent each other to define a laminated stack. The plurality of apertures is aligned with each other to define a slot extending parallel with a central axis. A magnet is disposed within the slot. The plurality of lamination sheets includes a tab lamination sheet. The tab lamination sheet includes a tab extending into the slot and into abutting engagement with the magnet. The tab biases the magnet against a wall of the slot to secure the magnet in position relative to the laminated stack.

A rotor assembly is also provided. The rotor assembly includes a plurality of lamination sheets. Each lamination sheet defines an aperture. The plurality of lamination sheets is disposed adjacent each other to define a laminated stack. The plurality of apertures are aligned with each other to define a slot extending parallel with a central axis. The plurality of lamination sheets includes a group of standard lamination sheets, a group of recess lamination sheets, and a tab lamination sheet. The tab lamination sheet is disposed between the group of standard lamination sheets and the group of recess lamination sheets. The tab lamination sheet includes a tab extending into the slot. The aperture of each of the recess lamination sheets includes a groove portion. The recess lamination sheets are stacked adjacent to each other such that the groove portions of each respective recess lamination sheet are disposed adjacent each other to define a groove extending parallel with the central axis. The tab of the tab lamination sheet is at least partially disposed within the groove defined by the recess lamination sheets.

An interior permanent magnet electric machine is also provided. The interior permanent magnet electric machine includes a stator, and a rotor assembly rotatable relative to the stator about a central axis. The rotor assembly includes a plurality of lamination sheets. Each lamination sheet defines a plurality of apertures. The plurality of lamination sheets is disposed adjacent each other to define a laminated stack, such that the plurality of apertures is aligned with each other to define a plurality of slots extending parallel with the central axis. The interior permanent magnet electric machine includes a plurality of magnets. One of the plurality of magnets is disposed within each of the plurality of slots. The plurality of lamination sheets includes a tab lamination sheet. The tab lamination sheet includes a plurality of tabs. One of the plurality of tabs extends into each of the plurality of slots, and into abutting engagement with the magnet disposed within the respective slot. The tab biases the magnet against a wall of the slot to secure the magnet in position relative to the laminated stack. The interior permanent magnet electric machine is characterized by the absence of an adhesive bonding the magnet to the laminated stack.

Accordingly, each slot in the laminated stack includes a tab that biases the magnet therein against a wall of the slot to secure the magnet in position relative to the laminated stack. The groove defined by the recess lamination sheets provides a relief to at least partially contain the tab to minimize a gap between the magnet and the slot when the tab is bent substantially perpendicular to the central axis. The above described mechanical retention system secures the magnets relative to the laminated stack without the need for an adhesive for bonding the magnets to the laminated stack.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
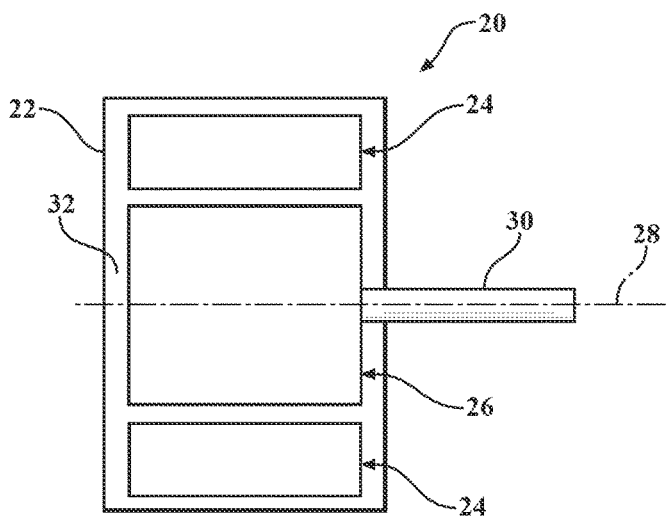
FIG. 1 is a schematic cross sectional view of an electric machine.

Referring to the Figures, wherein like numerals indicate like parts throughout the several views, an electric machine is shown generally at 20 in FIG. 1. The electric machine 20 may be referred to as an interior permanent magnet electric machine 20. Referring to FIG. 1, the electric machine 20 includes a housing 22 supporting a stator assembly 24. A rotor assembly 26 is rotatably attached to the housing 22 for rotation about a longitudinal or central axis 28 relative to the housing 22 and the stator assembly 24. A shaft 30 is attached to the rotor assembly 26 for rotation with the rotor assembly 26 about the central axis 28. As shown, the rotor assembly 26 is disposed within a central opening 32 of the stator assembly 24, and is concentric with the stator assembly 24 about the central axis 28. While FIG. 1 depicts a typical electric machine 20, it should be appreciated that the electric machine 20 may be configured in some other manner, such as for example with the rotor assembly 26 disposed annularly outside an outer periphery of the stator assembly 24. Accordingly, the scope of the claims should not be limited to the specific configuration of the electric machine 20 shown and described herein.

Figure 2:
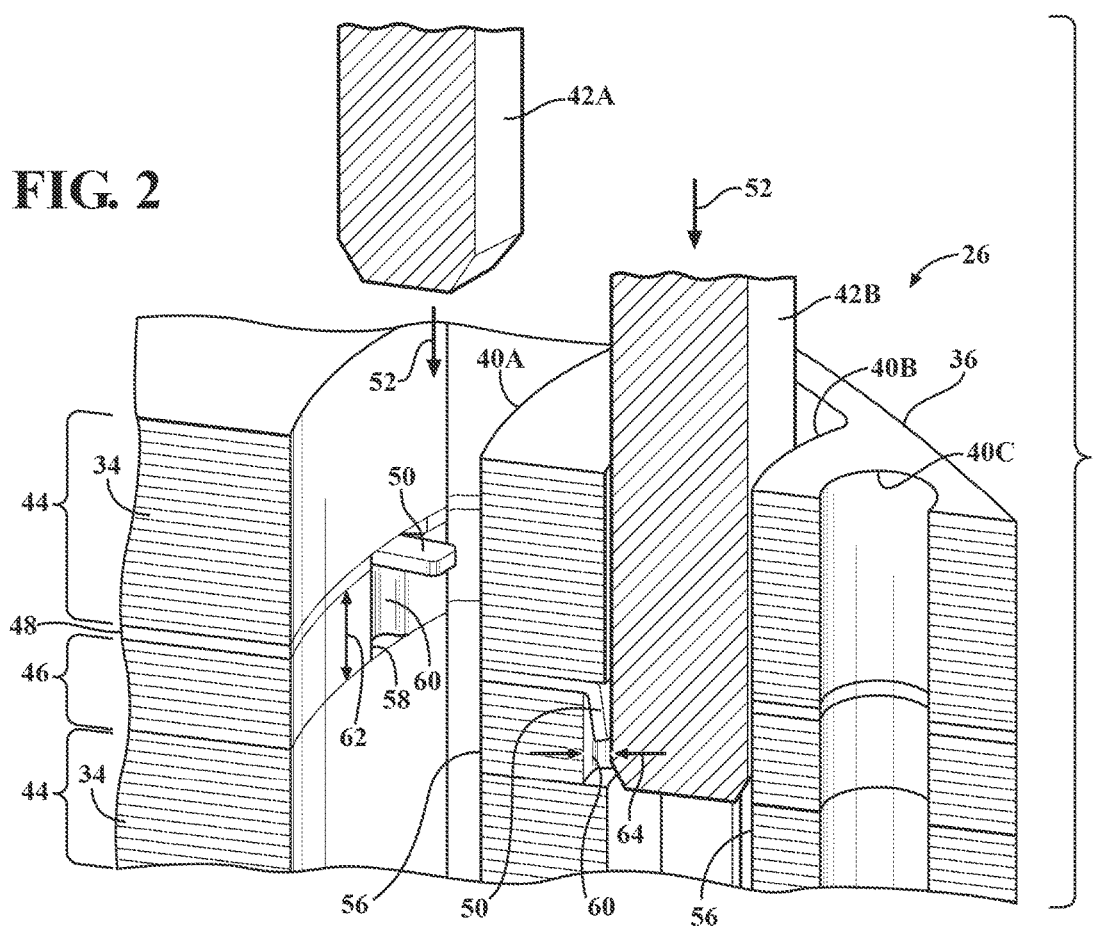
FIG. 2 is a schematic, partially exploded, fragmentary cross sectional view of a rotor assembly of the electric machine.
Figure 3:
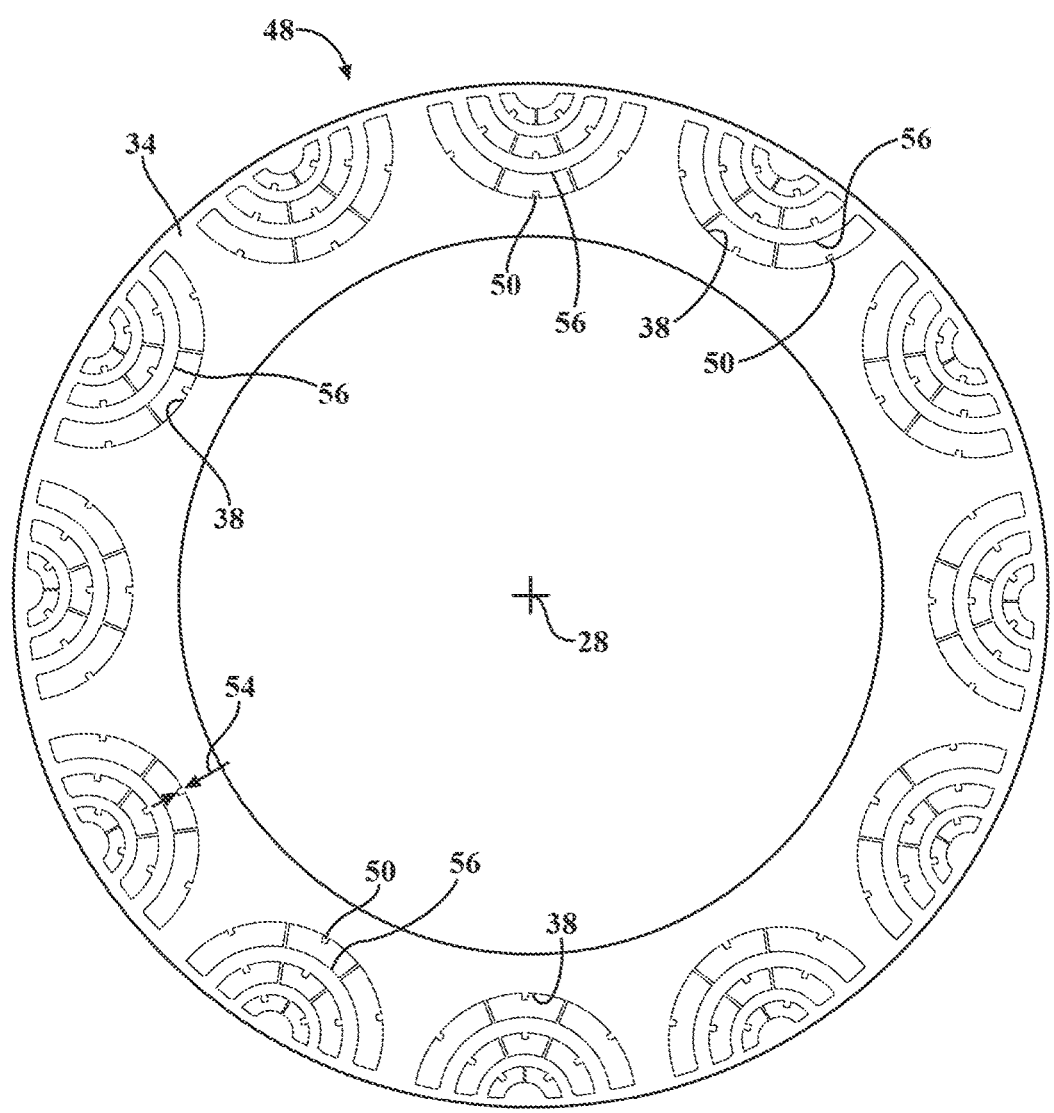
FIG. 3 is a schematic plan view of a laminated sheet of the rotor assembly.

Referring to FIGS. 2 and 3, the rotor assembly 26 includes a plurality of lamination sheets 34. Each of the lamination sheets 34 is preferably manufactured from steel, such as but not limited to non-orientated electrical steel. The lamination sheets 34 are disposed adjacent each other along the central axis 28 to define a laminated stack 36, shown in FIG. 2. The laminated stack 36 forms a core of the rotor assembly 26. The lamination sheets 34 are concentrically aligned along the central axis 28 to form the laminated stack 36.

As best shown in FIG. 3, each of the lamination sheets 34 defines at least one, and preferably a plurality of apertures 38. Referring to FIG. 2, when the lamination sheets 34 are aligned along the central axis 28 and relative to each other, the plurality of apertures 38 in the lamination sheets 34 is aligned with each other to define a plurality of slots 40. The slots 40 extend parallel with the central axis 28. The slots 40 are generally referred to by reference numeral 40. A first slot is specifically referred to by reference numeral 40A, a second slot is specifically referred to as 40B, and a third slot is specifically referred to as 40C.

As shown in FIG. 2, the rotor assembly 26 includes a plurality of magnets 42. One of the plurality of magnets 42 is disposed within each of the plurality of slots 40. The magnets 42 are generally referred to by reference numeral 42. A first magnet 42 is specifically referred to by reference numeral 42A, and a second magnet 42 is specifically referred to as 42B. The magnet 42 of each slot 40 is sized and shaped to fit within its respective slot 40. Accordingly, if the slot 40 includes a curved cross sectional shape perpendicular to the central axis 28, then the magnet 42 includes a corresponding curved cross sectional shape perpendicular to the central axis 28 so as to fit within the slot 40. It should be appreciated that the slots 40 and their respective magnets 42 may be formed to include curved cross sectional shapes or rectangular cross sectional shapes relative to the central axis 28. The magnets 42 may include, but are not limited to, ferrite magnets 42 or rare earth magnets 42, such as NdFeB.

Referring to FIG. 2, the plurality of lamination sheets 34 includes at least one group of standard lamination sheets 44, at least one group of recess lamination sheets 46, and at least one tab lamination sheet 48. Accordingly, it should be appreciated that the group of standard lamination sheets 44 include a plurality of standard lamination sheets 44 grouped or stacked together, with each of the lamination sheets 34 disposed within the group of standard lamination sheets 44 being substantially identical. The group of recess lamination sheets 46 includes a plurality of recess laminated sheets 46 grouped or stacked together, with each of the lamination sheets 34 disposed within the group of recess lamination sheets 46 being substantially identical. The tab lamination sheet 48 is disposed between the group of standard lamination sheets 44 and the group of recess lamination sheets 46.

The rotor assembly 26 may include multiple groups of standard lamination sheets 44, multiple groups of recess laminated sheets 46, with multiple tab lamination sheets 48, arranged in an alternating relationship. As such, an individual tab lamination sheet 48 is disposed between one group of standard lamination sheets 44 and one group of recess lamination sheets 46. Furthermore, the combination of one tab lamination sheet 48 and one group of recess lamination sheets 46 may be referred to as a laminated retention system. The rotor assembly 26 may include multiple laminated retention systems throughout the laminated stack 36, with each laminated retention system separated by one group of standard lamination sheets 44.

While the rotor assembly 26 may include multiple laminated retention systems, the detailed description below relates only to a single laminated retention system. It should be appreciated that the description below applies to all of the laminated retention systems within the rotor assembly 26. As noted above, the laminated retention system includes one tab lamination sheet 48 and one group of recess laminated sheets 46. The tab laminated sheet 48 includes a plurality of tabs 50. At least one of the plurality of tabs 50 extends into each of the plurality of apertures 38 of the respective tab lamination sheet 48, and thereby into each of the plurality of slots 40 of the rotor assembly 26. Each tab 50 extends into abutting engagement with the magnet 42 disposed within the respective slot 40 of the tab 50.

The tab lamination sheet 48 is initially formed such that the tab 50 is coplanar with the tab lamination sheet 48, and extends radially outward from the central axis 28 once installed in the laminated stack 36. The initial position of a tab 50 is shown in FIG. 2 in the first slot 40A. The magnets 42 of the respective slots 40 are axially inserted parallel with the central axis 28 into their respective slots 40, from an axial end, i.e., an insertion end, of laminated stack 36. The direction of insertion of the magnets 42 is generally indicated by the direction arrow 52. As the magnets 42 are inserted into the slots 40, the magnets 42 contact the tabs 50 within their respective slots 40, and bend the tabs 50 out of their way. In so doing, the tabs 50 are bent to an approximately parallel relationship relative to the slots 40 and the central axis 28. The final, bent position of a tab 50 is shown in FIG. 2 in the second slot 40B.

As shown in the first slot 40A, the tab 50 thereof includes a radial length 54 measured radially relative to the central axis 28. The tab 50 of the first slot 40A, prior to insertion of the first magnet 42A, extends into the first slot 40A a distance that is equal to the radial length 54. Preferably, the radial length 54 of the tabs 50 is between the range of 1 mm and 3 mm. However, it should be appreciated that the radial length 54 of the tabs 50 may vary from the exemplary embodiment. Furthermore, the radial length 54 of the tabs 50 may vary based on the specific size, shape and configuration of the slots 40 and their respective magnets 42.

Because the tabs 50 are bent during insertion of the magnets 42 into the slots 40, the tabs 50 act as a spring to bias their respective magnets 42 against an opposing wall 56 of their respective slots 40. The tabs 50 bias the magnets 42 against the wall 56 to secure the respective magnet 42 in position relative to the laminated stack 36. Preferably, the tabs 50 bias their respective magnets 42 toward a radially outer wall 56 of the slot 40 relative to the central axis 28. However, it should be appreciated that the tabs 50 may be positioned relative to the slot 40 to bias the magnets 42 toward some other radially positioned wall 56 of the slot 40. Because the tabs 50 bias the magnets 42 against the wall 56 of the laminated stack 36 to secure the position of the magnets 42 relative to the laminated stack 36, the rotor assembly 26 does not require any adhesive for bonding the magnets 42 to the laminated stack.

Referring to FIG. 3, each of the plurality of apertures 38 of each of the recess lamination sheets 46 includes a groove portion 58. Referring to FIG. 2, each of the recess lamination sheets 46 are stacked adjacent to each other such that the groove portions 58 of each respective recess lamination sheet 46 are disposed adjacent each other to define a plurality of grooves 60 extending parallel with the central axis 28. One of the plurality of grooves 60 is disposed within each of the plurality of slots 40, adjacent and directly behind the respective tab 50 of the slot 40, relative to the direction of insertion of the magnets 42.

After insertion of the magnets 42 within their respective slots 40, each tab 50 of the tab lamination sheet 48 is at least partially disposed within the respective groove 60 of the slot 40 defined by the recess lamination sheets 46. Each groove 60 defines a longitudinal length 62 measured parallel with the central axis 28. The longitudinal length 62 of the groove 60 is greater than the radial length 54 of the tab 50, so that when each tab 50 is bent into its final position, the tab 50 does not bind between the slot 40 and the magnet 42 and prevent insertion of the magnet 42 into its respective slot 40.

The grooves 60 are recessed into the laminated stack 36 from their respective slots 40 at least a recess distance 64. The lamination sheets 34 and the tabs 50 include a thickness measured parallel with the central axis 28. The recess distance 64 is preferably equal to or greater than a thickness of the lamination sheets 34. Preferably, the lamination sheets 34 and the tabs 50 include a thickness measured parallel with the central axis 28 that is between the range of 0.25 mm and 0.5 mm. Preferably the recess distance 64 that the grooves 60 are recessed from the slots 40 is equal to or greater than 0.25 mm. However, it should be appreciated that the thickness of the lamination sheets 34 and the tabs 50, and the recess distance 64 of the grooves 60, may vary.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A rotor assembly for an electric machine, the rotor assembly comprising:
   a plurality of lamination sheets, with each lamination sheet defining an aperture, wherein the plurality of lamination sheets are disposed adjacent each other to define a laminated stack, with the plurality of apertures aligned with each other to define a slot extending parallel with a central axis; and
   a magnet disposed within the slot;
   wherein the plurality of lamination sheets includes a tab lamination sheet having a tab extending into the slot and into abutting engagement with the magnet; and
   wherein the tab biases the magnet against a wall of the slot to secure the magnet in position relative to the laminated stack;
   wherein the plurality of lamination sheets includes a group of standard lamination sheets, and a group of recess lamination sheets, with the tab lamination sheet disposed between the group of standard lamination sheets and the group of recess lamination sheets.

2. A rotor assembly as set forth in claim 1 wherein the tab biases the magnet toward a radially outer wall of the slot relative to the central axis.

3. A rotor assembly as set forth in claim 1 wherein the tab of the tab lamination sheet is bent relative to the tab lamination sheet to extend substantially parallel with the central axis.

4. A rotor assembly as set forth in claim 1 wherein the aperture of each of the recess lamination sheets includes a groove portion, with each of the recess lamination sheets stacked adjacent to each other such that the groove portions of each respective recess lamination sheet are disposed adjacent each other to define a groove extending parallel with the central axis.

5. A rotor assembly as set forth in claim 4 wherein the tab of the tab lamination sheet is at least partially disposed within the groove defined by the recess lamination sheets.

6. A rotor assembly as set forth in claim 5 wherein the groove defines a longitudinal length parallel with the central axis, wherein the longitudinal length of the groove is greater than the radial length of the tab.

7. A rotor assembly as set forth in claim 4 wherein the groove is recessed from the slot a recess distance, and wherein the tab includes a thickness measured parallel with the central axis, with the recess distance equal to or greater than the thickness of the tab.

8. A rotor assembly as set forth in claim 1 characterized by the absence of an adhesive bonding the magnet to the laminated stack.

9. A rotor assembly comprising:
   a plurality of lamination sheets, with each lamination sheet defining an aperture, wherein the plurality of lamination sheets are disposed adjacent each other to define a laminated stack, with the plurality of apertures aligned with each other to define a slot extending parallel with a central axis;
   wherein the plurality of lamination sheets includes a group of standard lamination sheets, a group of recess lamination sheets, and a tab lamination sheet disposed between the group of standard lamination sheets and the group of recess lamination sheets;
   wherein the tab lamination sheet includes a tab extending into the slot;
   wherein the aperture of each of the recess lamination sheets includes a groove portion, with each of the recess lamination sheets stacked adjacent to each other such that the groove portions of each respective recess lamination sheet are disposed adjacent each other to define a groove extending parallel with the central axis; and
   wherein the tab of the tab lamination sheet is at least partially disposed within the groove defined by the recess lamination sheets.

10. A rotor assembly as set forth in claim 9 further comprising a magnet disposed within the slot, with the tab biasing the magnet against a wall of the slot to secure the magnet in position relative to the laminated stack.

11. A rotor assembly as set forth in claim 9 wherein the tab of the tab lamination sheet is bent relative to the tab lamination sheet to extend substantially parallel with the central axis.

12. A rotor assembly as set forth in claim 11 wherein the groove defines a longitudinal length parallel with the central axis, wherein the longitudinal length of the groove is greater than the radial length of the tab.

13. A rotor assembly as set forth in claim 12 wherein the groove is recessed from the slot a recess distance, and wherein the tab includes a thickness measured parallel with the central axis, with the recess distance equal to or greater than the thickness of the tab.

14. An interior permanent magnet electric machine comprising:
- a stator;
- a rotor assembly rotatable relative to the stator about a central axis, the rotor assembly including:
    - a plurality of lamination sheets, with each lamination sheet defining a plurality of apertures, wherein the plurality of lamination sheets are disposed adjacent each other to define a laminated stack such that the plurality of apertures are aligned with each other to define a plurality of slots extending parallel with the central axis; and
    - a plurality of magnets, with one of the plurality of magnets disposed within each of the plurality of slots;
- wherein the plurality of lamination sheets includes a tab lamination sheet having a plurality of tabs, with one of the plurality of tabs extending into each of the plurality of slots and into abutting engagement with the magnet disposed within the respective slot;
- wherein the tab biases the magnet against a wall of the slot to secure the magnet in position relative to the laminated stack; and characterized by the absence of an adhesive bonding the magnet to the laminated stack.

15. An interior permanent magnet electric machine as set forth in claim 14 wherein the plurality of lamination sheets includes a group of standard lamination sheets, and a group of recess lamination sheets, with the tab lamination sheet disposed between the group of standard lamination sheets and the group of recess lamination sheets.

16. An interior permanent magnet electric machine as set forth in claim 15 wherein each of the plurality of apertures of each of the recess lamination sheets includes a groove portion, with each of the recess lamination sheets stacked adjacent to each other such that the groove portions of each respective recess lamination sheet are disposed adjacent each other to define a plurality of grooves extending parallel with the central axis, one of the plurality of grooves disposed within each of the plurality of slots.

17. An interior permanent magnet electric machine as set forth in claim 16 wherein each tab of the tab lamination sheet disposed within each respective slot is at least partially disposed within the groove defined by the recess lamination sheets of each respective slot.

* * * * *